Oct. 4, 1966  E. O. McKINNEY ET AL  3,277,278
PORTABLE ELECTRIC COOKING APPARATUS
Filed Jan. 31, 1964  2 Sheets—Sheet 1
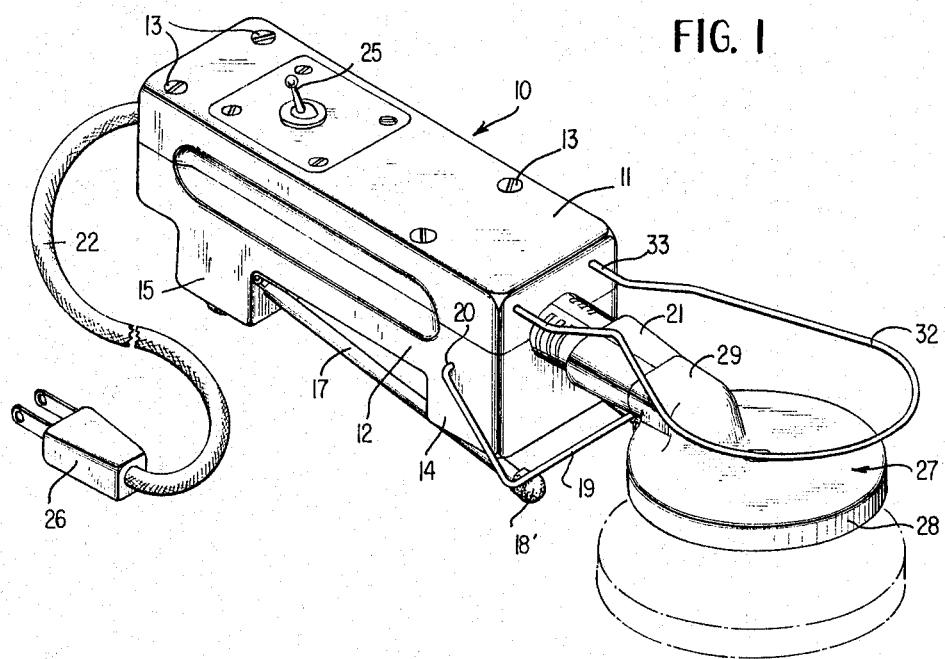
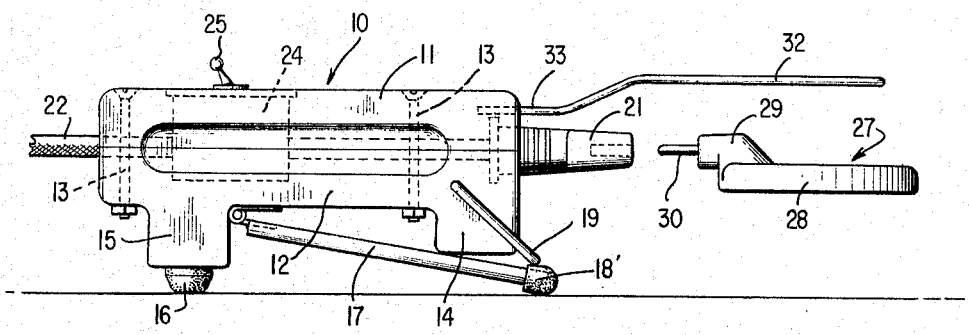
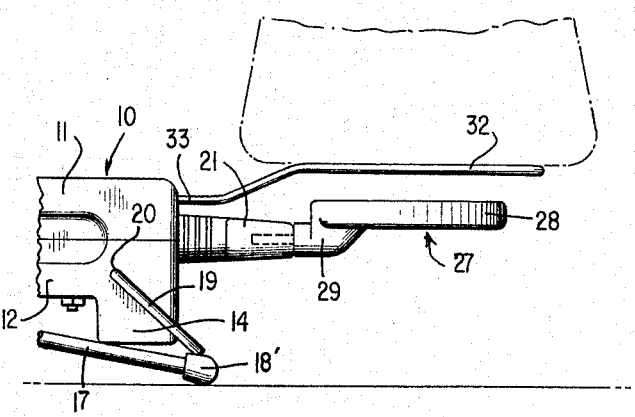
INVENTORS.
ELDON O. McKINNEY
FLORENCE EVANS
BY B. P. Fishburne, Jr.
ATTORNEY

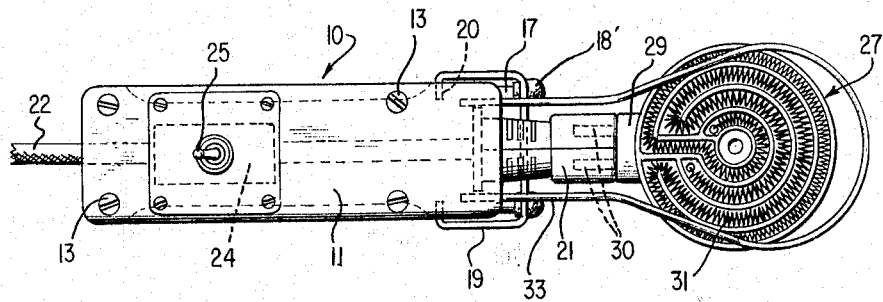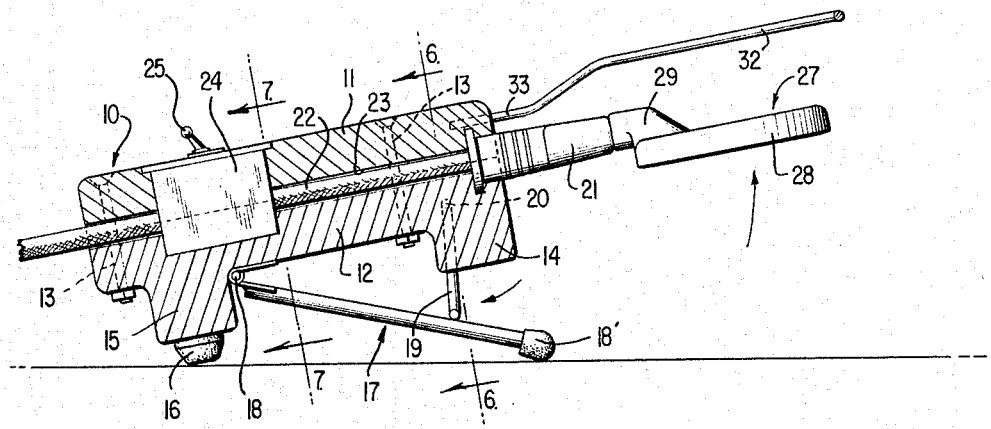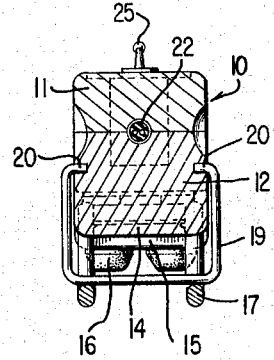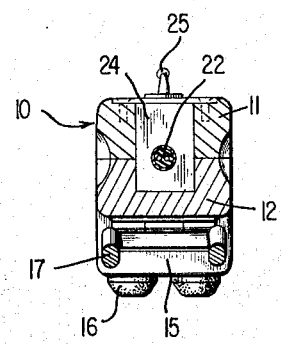

United States Patent Office 3,277,278
Patented Oct. 4, 1966

3,277,278
PORTABLE ELECTRIC COOKING APPARATUS
Eldon O. McKinney, 210 W. Sunny Dunes, Palm Springs, Calif., and Florence Evans, Box 146, Morongo Valley, Calif.
Filed Jan. 31, 1964, Ser. No. 341,564
3 Claims. (Cl. 219—444)

This invention relates to a portable electric broiler or heating device, primarily intended for use in cooking or warming food when no regular cooking equipment is available.

There are many occasions when the traveler, occupant of a room, college student or like individual has the need for some ready means to broil a small steak, prepare a slice of toast, heat a small receptacle of coffee or the like, and it frequently happens that no cooking equipment is available. The object of this invention is to provide a readily portable lightweight and inexpensive electrical appliance which may be carried in an overnight bag or in a separate small case and which will fully satisfy the above-mentioned needs, whenever there is a source of regular house current available.

Another and more specific object of the invention is to provide an electrical cooking unit which is capable of broiling a small steak or like food item or heating a small receptacle of coffee, without the need for any auxiliary equipment whatsover. The device is characterized by a simplified and compact resistance heating element which is reversible for directing heat upwardly or downwardly. A small body portion or stand which normally carries the heating element is adjustable vertically with respect to a supporting surface to somewhat vary the height of the heating element as found necessary for heating or cooking food items of various sizes and shapes. The device has certain separable components which render the same even more compact for storage or transporting.

Other objects and advantages of the invention will be apparent during the course of the following detailed description.

In the accompanying drawings forming a part of this application and in which like numerals are employed to designate like parts throughout the same, FIGURE 1 is a perspective view of an electrical cooking unit embodying the invention, FIGURE 2 is a side elevation of the unit, partly exploded, on a somewhat reduced scale, FIGURE 3 is a fragmentary side elevation of the assembled unit with the heating element thereof facing upwardly, FIGURE 4 is a top plan view of the unit as shown in FIGURE 3, FIGURE 5 is a central vertical longitudinal section through the cooking unit, parts in elevation, and showing the heating element elevated by means of adjustable components on the body portion, FIGURE 6 is a transverse section taken on line 6—6 of FIGURE 5, and FIGURE 7 is a similar section taken on line 7—7 of FIGURE 5.

In the drawings, wherein for the purpose of illustration is shown an embodiment of the invention, the numeral 10 designates generally a body portion or handle which is generally rectangular and elongated and adapted to be formed of wood, molded plastic or the like. The body portion 10 of the cooking unit has been alternately termed a handle because it is sufficiently small to be held and manipulated in one hand and does, in effect, constitute a handle for the unit when the same is being shifted from one position to another or placed upon a table or other support for usage.

The body portion 10 may comprise an upper plate section 11 and a lower base section 12, detachably connected therewith by means of screws 13 or the like. The base section 12 has forward and rear depending leg projections 14 and 15, with the forward projection 14 somewhat shorter than the rear leg projection, as shown. The rear leg projection 15 may be equipped with plastic or rubber feet 16 as shown in the drawings.

An adjusting leg unit 17 is hinged at 18 to the base section 12 and is vertically swingable relative thereto as indicated in FIGURES 2 and 5. The element 17 also preferably carries plastic or rubber feet 18' at its forward extremities to prevent marring furniture or the like. A coacting bail or loop 19 has its upper end 20 hinged to the base section 12, near and above the forward leg projection 14, and this bail coacts with the adjusting leg unit 17 in the manner shown in FIGURE 5 to regulate the height of the electrical heating element above the supporting surface, such as a table top or window sill. As shown in FIGURE 2 and also in FIGURE 3, when the bail 19 is swung to an inactive position, the front leg projection 14 may rest directly upon the adjusting leg unit 17 and the body portion 10 is then level or parallel to the supporting table or the like.

A conventional receptacle or socket 21 for a two-pronged plug is clamped in assembly between the sections 11 and 12 of the body portion 10, as shown in the drawings. The opposed faces of the sections 11 and 12 are suitably recessed to receive and firmly anchor the receptacle 21, as shown. An insulated electrical cable 22 leads from the receptacle 21 and extends through a passage 23, formed by mating grooves in the sections 11 and 12, lengthwise thereof. An "on" and "off" switch 24 having a manual actuator 25 is electrically connected in the cable 22, and the body portion sections 11 and 12 are recessed to receive the switch 24 therein, whereby the top of the switch is flush with the top of the body portion or handle as shown in the drawings.

The cable 22 extends from the rear end of the body portion 10 and may be of any desired or convenient length for connection with a wall or baseboard outlet. The cable 22 is equipped at its free end with a conventional two-pronged plug 26.

It may be observed that the two sections 11 and 12 of the body portion 10 serve to releasably clamp the receptacle 21, cable 22 and switch 24 to the body portion in a secure, compact and partially concealed manner. The construction renders the device neat and uncluttered in appearance and it is a very simple matter to take the device apart for repair, if necessary.

The heating element proper is shown at 27 and comprises a porcelain or ceramic shallow disc-like body 28, which may be circular or some other shape, if preferred. The disc-like body 28 has an integral projection 29 at one side thereof having prongs 30 firmly anchored therein for electrical coupling with the openings of the receptacle 21. The porcelain body 28 is grooved on one face thereof in a conventional manner, as shown clearly in FIGURE 4, to receive and anchor a rather long electrical resistance heating element 31, having its ends or terminals electrically connected with the prongs 30.

The heating element 27 is readily separable from the receptacle 21, and may be engaged therewith so that heat may be directed upwardly or downwardly as desired for a particular use, and this constitutes one of the unique features of the cooking unit or apparatus.

A stiff wire supporting frame or loop 32 is provided for detachable connection with the body portion 10 near and above the heating element 27. The frame 32 has parallel extensions 33 engageable detachably within small openings formed in the forward end of body portion section 11, as shown. The frame 32 and the heating element 27 are both separated from the body portion 10 so that the device may be conveniently packaged in the most compact manner while not in use or while traveling. The disassembled device is so small that it may be conveniently carried in the corner of an overnight bag or in a separate case no larger than the usual shaving kit case.

The use or operation of the device is believed to be quite obvious in light of the foregoing description. However, it may be pointed out briefly that when it is desired to cook or broil a hamburger, small steak or like food article on a plate or in a metal foil container or the like, the heating element 27 is mounted upon the receptacle 21 for directing heat downwardly. The height of the heating element 27 relative to the table or food item is adjusted where necessary by means of the elements 17 and 19 as previously explained. The switch 24 is placed in the "on" position and the resistance element 31 quickly furnishes the necessary intense heat for broiling or cooking.

With the heating element 27 mounted to direct heat upwardly, FIGURES 3 and 4, a sandwich, slice of toast or a small liquid receptacle containing coffee or the like may be placed upon the frame 32 as illustrated in FIGURE 3 and the heating element will quickly heat the contents. A variety of beverages and food items may be quickly and conveniently cooked or warmed to the desired degree by means of the unit. There is no necessity for any auxiliary equipment and all that is required is a readily accessible electrical wall outlet, which is available in practically any room. The unit finds particular application or use by the occupants of rooming houses and the like where no regular cooking facilities are available. College students and tourists will also find the device highly useful for cooking short orders when it is too late to have food served in a room or when no such service is available. When used in conjunction with the everyday disposable aluminum foil plates and receptacles for certain frozen foods, the device is highly convenient and efficient and there is no necessity or likelihood of soiling the surrounding area when normal precautions are taken. The unit may be set up on a window sill, table top or any convenient level supporting surface. The advantages of the device will be apparent to those skilled in the art without the necessity for any further description.

It should be mentioned that the receptacle 21 for the prongs 30 may, if desired, be formed as an integral part of the body portion or handle 10, as where the latter is molded from plastic, bakelite or the like. In such case, the receptacle 21 would be parted on the same line separating the top and bottom sections 11 and 12 of the body portion.

Additionally, the plug 26 and cable 22 may be adapted for plugging in to a suitable electric outlet on the dashboard of an automobile, boat or airplane, all within the scope of the invention.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described our invention, we claim:

1. A portable electric cooking apparatus comprising a two-part block-like handle body portion and means for detachably securing the parts of said body portion together in opposed relationship, an electrical receptacle, cable and control switch clampingly engaged between said parts of the body portion, said cable extending beyond one end of the body portion and adapted for connection with an electrical outlet, a pair of coacting adjusting elements pivoted to said body portion and operable to adjust the height of one end of the body portion relative to a level supporting surface, a resistance heating element having prongs detachably engageable with said receptacle selectively for directing heat downwardly or upwardly relative to said body portion, and a supporting frame element detachably engageable with said body portion above said receptacle and heating element and substantially parallel thereto.

2. A portable electric cooking unit comprising a body portion of a size and shape convenient for holding in one hand, said body portion adapted to rest on a level surface, adjustable means on said body portion engageable with said surface for regulating the height of the body portion above said surface, an electrical receptacle on said body portion projecting beyond one end thereof, an electrical cable including an "on" and "off" switch connected with and leading from said receptacle and secured to the body portion, a pronged electrical resistance heating element having a heating face adapted for connection with said receptacle selectively for directing heat upwardly or downwardly toward or away from said surface, and a supporting frame element detachably secured to said body portion near and above said receptacle and heating element and substantially parallel to the heating element for supporting a food article or beverage container in close proximity to the heating element.

3. A portable electric cooking unit comprising an elongated body portion which is sufficiently slender to be conveniently gripped in one hand to serve as a handle for said unit, an electrical receptacle on the leading end of said body portion projecting forwardly thereof, an electrical cable connected with said receptacle and extending therefrom and adapted for connection with a source of power, a pronged electrical resistance heating element having a primary heating face adapted for connection with the receptacle detachably and selectively for directing heat upwardly or downwardly and a hinged and foldable leg and brace structure on the bottom of said body portion including a part engageable with a support surface and whose angular relationship to the body portion may be varied to adjust the elevation of the leading end of the body portion.

References Cited by the Examiner

UNITED STATES PATENTS 2,024,386  12/1935  Phelps _____ 219—395

FOREIGN PATENTS 535,872  4/1941  Great Britain.

RICHARD M. WOOD, *Primary Examiner.*

L. H. BENDER, *Assistant Examiner.*